United States Patent Office 3,085,900
Patented Apr. 16, 1963

3,085,900
PROCESS OF FORMING A GALVANIC ACTION COATING ON A FERROUS SURFACE
Stanley L. Lopata, Ladue, and William R. Keithler, Kirkwood, Mo., assignors to Carboline Company, St. Louis, Mo., a corporation of Missouri
No Drawing. Filed June 4, 1959, Ser. No. 818,000
3 Claims. (Cl. 117—62)

This invention relates in general to protective coatings containing zinc and, more particularly, to zinc coatings adapted for application to ferrous surfaces.

In the formulation of protective coatings giving cathode protection to ferrous surfaces, various efforts have heretofore been made to take advantage of the film-forming characteristics of water glass, colloidal silica, and various resins. Such materials, furthermore, adhere very well to ferrous surfaces, even when such surfaces are lightly oxidized or corroded.

Moreover, such coatings ordinarily are compounded with powdered metallic pigments such as zinc and aluminum, both of which stand higher than iron in the electromotive series and, when incorporated in a suitably permeable vehicle, will afford galvanic protection to iron, steel, and similar ferrous surfaces.

The protective coatings of this type which have previously been prepared, however, are rather brittle, if applied too heavily, and tend to flake off or crack under expansion, contraction, vibration, and similar mechanical stresses. If the ratio of zinc to vehicle is sufficient to provide cathodic protection, the film is powdery, soft, and friable.

It is, therefore, the primary object of the present invention to provide methods and means for hardening organic-zinc and inorganic-zinc coatings of the type stated to render them highly adherent and abrasion resistant, some of which can be completely compounded long prior to use and, when so compounded, will remain suitable for use and application to ferrous surfaces for relatively long periods of time.

It is another object of the present invention to provide means and methods by which a coating of the type stated can be readily applied to a ferrous surface in the manner of a paint and quickly hardened in a simple and economical manner.

It is also an object of the present invention to provide means and methods for treating coatings of the type stated whereby to cause such coatings to set up on the ferrous surface in a hard, abrasion-resistant, tightly adherent film which is sufficiently permeable to permit efficient galvanic protection of the ferrous surface.

With the above and other objects in view, our invention resides in the novel means and processes of matter presently described and pointed out in the claims.

Various galvanic action coatings have been prepared in which powdered metals or metallic materials are incorporated in suitable vehicles. For instance, materials such as chlorinated rubber, polystyrene, polyvinyl chloride, alkyd resins, phenolic resins, and acrylic resins are conventionally dissolved in suitable solvents, such as ethanol, methylethylketone or the like, to form a liquid vehicle. In fact, the preparation of such vehicles is common practice in paint and varnish technology. A comparatively large proportion of the powdered metallic pigment, such as, for instance, powdered zinc, is thoroughly mixed into the vehicle and applied as a paint upon the surface to be protected. Under present practice about 85% to 95% by weight of pigment is used. Lesser amounts reduce sharply the galvanic action of the coating because each minute particle of metal tends to be isolated within its own tiny capsule or cell of the vehicle. Since the vehicle is dielectric the metal particles are largely insulated from each other and from the metal surface to be protected. Hence, protective galvanic action is impaired. On the other hand, more than 95% of the powdered metal would be desirable so far as galvanic action is concerned but the resultant coating is soft and loosely adherent.

Similarly, galvanic action coatings have been prepared which consist of silicates with powdered metallic pigment incorporated therein. For example, ethyl silicate in various forms can be used as a vehicle for powdered zinc, powdered aluminum, powdered lead, powdered copper and the like. Such metallic pigments are also present in relatively high percentages and, as a result, the coatings are somewhat soft and usually require a very long hardening or curing time.

The present invention resides in the discovery that coatings of the type above discussed can be applied to a ferrous surface in the usual manner and shortly after application brushed with an aqueous solution containing a salt, such as sodium chloride and ethanol. Other salts which have been found effective are sodium iodide, sodium nitrate, and ammonium chloride.

Humectants such as glycerine, lower glycols and sorbitol aid the hardening by retarding the drying time of said hardening agents.

Quantities of finely divided silica, asbestos or other absorptive, inert filler are beneficial in hardening as they allow a heavier application of hardening agent, especially on vertical surfaces.

By way of illustration, and not by way of limitation, the following are examples of hardening agents formulated in accordance with the present invention.

Example I

|  | Parts by weight |
|---|---|
| NaCl | 2 |
| $H_2O$ | 6 |
| Ethanol | 2 |

Example II

| NaCl | 3 |
|---|---|
| $H_2O$ | 7 |
| Ethanol | 2 |

Example III

| NaCl | 1 |
|---|---|
| $H_2O$ | 6 |
| Ethanol | 1 |

Example IV

| NaCl | 1 |
|---|---|
| $H_2O$ | 7 |
| Ethanol | 4 |

Example V

| NaI | 2 |
|---|---|
| $H_2O$ | 6 |
| Ethanol | 2 |

Example VI

| $NH_4Cl$ | 2 |
|---|---|
| $H_2O$ | 6 |
| Ethanol | 2 |

Example VII

| NaCl | 2 |
|---|---|
| $H_2O$ | 7 |
| Ethanol | 2 |
| Ethylene glycol | 1 |

Example VIII

| | |
|---|---|
| NaCl | 2 |
| $H_2O$ | 7 |
| Ethanol | 2 |
| Asbestos | 2 |

The above proportions are not highly critical. In fact, the proportions of the salt can be varied from 10% to 40% by weight. The water can be varied from 10% to 80% by weight. The ethanol can be varied from 10% to 90% by weight.

The solutions of the present invention are brushed or sprayed on the outer surface of the coating after the coating has started to set up or lose its fluid character, so to speak. Within a relatively short period of time after application the coating will have become hard, tough, adherent, and possesses much improved abrasion resistant qualities. In fact, with resin-based materials it becomes possible to use up to 99% by weight of metallic pigments and, by use of the herein-discussed hardening agents, obtain a highly efficient coating.

It should be understood that changes in the methods, compositions, and combinations above set forth may be made without departing from the nature and principle of our invention.

Having thus described our invention, what we claim and desire to secure by Letters Patent is:

1. The method of forming a protective galvanic-action coating on a ferrous metal surface which method comprises applying a liquid coating material to the surface, said liquid coating material consisting of a finely divided metallic pigment of higher order in the electromotive series than iron, said pigment being dispersed in a vehicle comprising a solvent and a silicate selected from the group consisting of sodium silicate and ethyl silicate, allowing said coating material to dry at least until all the solvent has evaporated therefrom and thereby forming a dry permeable film on said ferrous metal surface, and thereupon applying to the surface of said film an alcohol-water solution containing a monovalent salt of the group consisting of sodium iodide, sodium chloride, sodium nitrate, and ammonium chloride.

2. The method of forming a protective galvanic-action coating on a ferrous metal surface which method comprises applying a liquid coating material to the surface, said liquid coating material consisting of a finely divided metallic pigment of higher order in the electromotive series than iron, said pigment being dispersed in a vehicle comprising a solvent and a silicate selected from the group consisting of sodium silicate and ethyl silicate, allowing said coating material to dry at least until all the solvent has evaporated therefrom and thereby forming a dry permeable film on said ferrous metal surface, and thereupon applying, to the surface of said film, a liquid agent consisting of sodium chloride dissolved in an alcohol-water solution.

3. The method of forming a protective galvanic-action coating on a ferrous metal surface according to claim 2 in which the proportions of the liquid agent are as follows:

| | Percent by weight |
|---|---|
| Sodium chloride | 10 to 30 |
| Water | 40 to 70 |
| Alcohol | 10 to 40 |

References Cited in the file of this patent

UNITED STATES PATENTS

| | | |
|---|---|---|
| 419,657 | Gesner | Jan. 21, 1890 |
| 1,613,758 | Lindstrom | Jan. 11, 1927 |
| 2,286,963 | Hauser et al. | June 16, 1942 |
| 2,347,925 | Owens | May 2, 1944 |
| 2,440,969 | Nightingall | May 4, 1948 |
| 2,540,108 | Fisher | Feb. 6, 1951 |
| 2,776,911 | Gregory | Jan. 8, 1957 |
| 2,944,919 | Morris et al. | July 12, 1960 |
| 2,955,958 | Brown | Oct. 11, 1960 |

OTHER REFERENCES

Solubilities of Inorganic and Organic Compounds (Seidell), 2nd edition, 2nd printing, D. Van Nostrand Co. (N.Y.), 1919 (pages 49, 197, 257, 646 and 655 relied on).

Lange's Handbook of Chemistry, 7th edition, Handbook Publishers Inc. (N.Y.), 1949 (pages 209, 210, and 243 relied on).